United States Patent
Gokingco et al.

(10) Patent No.: US 8,698,471 B2
(45) Date of Patent: Apr. 15, 2014

(54) SYSTEMS AND METHODS FOR A DIGITAL-TO-CHARGE CONVERTER (DQC)

(75) Inventors: Jefferson L. Gokingco, Austin, TX (US); Stephen C. Gerber, Austin, TX (US); Wayne T. Holcombe, Mountain View, CA (US); Miroslav Svajda, San Jose, CA (US); Robert G. Farmer, Modesto, CA (US)

(73) Assignee: Silicon Laboratories Inc., Austin, TX (US)

( * ) Notice: Subject to any disclaimer, the term of this patent is extended or adjusted under 35 U.S.C. 154(b) by 599 days.

(21) Appl. No.: 12/975,819

(22) Filed: Dec. 22, 2010
(Under 37 CFR 1.47)

(65) Prior Publication Data
US 2011/0248649 A1    Oct. 13, 2011

Related U.S. Application Data

(60) Provisional application No. 61/323,798, filed on Apr. 13, 2010.

(51) Int. Cl.
*G05F 1/56* (2006.01)
*G05F 1/00* (2006.01)

(52) U.S. Cl.
USPC ........... 323/285; 323/288; 323/283; 323/282; 323/326; 315/291; 315/307; 315/209 CD; 315/247

(58) Field of Classification Search
USPC .............. 315/247, 185 S, 224, 291, 307–326; 323/285, 288, 283, 282, 326, 234, 246
See application file for complete search history.

(56) References Cited

U.S. PATENT DOCUMENTS

| | | | | |
|---|---|---|---|---|
| 4,745,614 A * | 5/1988 | Egawa et al. | | 372/85 |
| 5,317,281 A * | 5/1994 | Vinn et al. | | 330/265 |
| 5,579,007 A | 11/1996 | Paul | | |
| 5,668,551 A | 9/1997 | Garavan et al. | | |
| 5,760,723 A | 6/1998 | McGrath et al. | | |
| 6,624,640 B2 | 9/2003 | Lund et al. | | |
| 7,071,677 B2 * | 7/2006 | Taylor | | 324/111 |
| 8,040,121 B2 * | 10/2011 | Ishida et al. | | 323/285 |
| 8,072,201 B2 * | 12/2011 | Umemoto et al. | | 323/282 |
| 8,283,876 B2 | 10/2012 | Ji | | |
| 8,531,167 B2 * | 9/2013 | Yamaguchi et al. | | 323/285 |

* cited by examiner

*Primary Examiner* — Tuyet Thi Vo
(74) *Attorney, Agent, or Firm* — Meyertons, Hood, Kivlin, Kowert & Goetzel, P.C.

(57) ABSTRACT

Systems and methods for a digital-to-charge converter ("DQC") are disclosed. A DQC may include a converting circuit configured to receive a first digital signal indicative of a voltage across a capacitor coupled to an output pin of the digital-to-charge converter and to determine a present charge of the capacitor based at least in part on the first digital signal. The DQC may also include an error determining circuit coupled to the converting circuit, wherein the error determining circuit is configured to receive a second digital signal indicative of a target charge via an input pin of the digital-to-charge converter and to determine a difference between the target charge and the present charge. The DQC may further include a correction circuit coupled to the error determining circuit and configured to control a programmable current source to produce an analog signal at the output pin in response to the determined difference.

18 Claims, 4 Drawing Sheets

SYSTEMS AND METHODS FOR A DIGITAL-TO-CHARGE CONVERTER (DQC)

CROSS REFERENCE TO RELATED APPLICATIONS

This disclosure is related and claims priority to U.S. Patent Provisional Application No. 61/323,798, entitled "APPARATUS WITH OPTICAL FUNCTIONALITY AND ASSOCIATED METHODS" filed on Apr. 13, 2010, and which is hereby incorporated by reference in its entirety.

BACKGROUND

1. Field of the Invention

This disclosure relates to electronic circuits, and, more particularly, to systems and methods for a digital-to-charge converter ("DQC").

2. Description of the Related Art

A digital-to-analog converter ("DAC") is a circuit that converts a digital signal into an analog signal. Typically, the resulting analog signal is directly proportional to the value of the digital signal. For example, the input signal may be a digital sequence of numbers provided by a controller at discrete time intervals, and the analog signal may be an analog voltage or current. Because a conventional DAC is always on, it does not work well in low-power applications. Therefore, in those situations, a DAC may be replaced with a Pulse Width Modulator ("PWM") circuit.

In a PWM circuit, a pulse train is output with varying duty cycles as a function of a digital input signal. The pulse train is driven into an R-C low-pass filter to remove a fundamental PWM frequency, which toggles at a fixed rate that is much faster than the slew rate of the desired analog output. In the R-C low-pass filter stage, the charge in the capacitor alternates between charging and discharging while power is constantly dissipated across the resistor. When providing a digital input code to a PWM circuit, a low-power controller toggles the voltage during its active state and may be "asleep" in between the toggle times of the PWM waveform. Accordingly, the low-power controller normally "wakes up" at twice the PWM frequency, also consuming significant amounts of power.

SUMMARY

Systems and methods for a digital-to-charge converter ("DQC") are described. In an embodiment, a DQC may include a converting circuit configured to receive a first digital signal indicative of a voltage across a capacitor coupled to an output pin of the digital-to-charge converter and to determine a present charge of the capacitor based at least in part on the first digital signal. The DQC may also include an error determining circuit coupled to the converting circuit, wherein the error determining circuit is configured to receive a second digital signal indicative of a target charge via an input pin of the digital-to-charge converter and to determine a difference between the target charge and the present charge. The DQC may further include a correction circuit coupled to the error determining circuit and configured to control a programmable current source to produce an analog signal at the output pin in response to the determined difference.

In an embodiment, a computer-readable storage medium may have instructions stored thereon that, upon execution by a computer system, cause the computer system to perform various operations. These operations may include receiving a first digital signal indicating a target voltage; converting the target voltage indication to a target charge value; receiving a second digital signal indicating a present voltage at an output terminal; converting the present voltage indication to a present charge value; and controlling a programmable current source to apply an electrical current to the output terminal, wherein the electrical current is responsive to a difference between the present charge value and the target charge value, and wherein the electrical current causes a voltage across the output terminal to at least approach the target voltage.

In an embodiment, a method may include receiving a target charge value; measuring a voltage at an output; converting the measured voltage to a present charge value; and applying a charge pulse to the output that is proportional to a difference between the present charge value and the target charge value. In another embodiment, a method may include measuring an electrical charge stored by a capacitor; and in response to a difference between the measured electrical charge and a target charge satisfying a condition, supplying a charge correction current to the capacitor, wherein a parameter of the charge correction current is calculated based, at least in part, on a difference between the measured charge and the target charge.

While being susceptible to various modifications and alternative forms, specific embodiments discussed in this specification are shown by way of example in the drawings and will herein be described in detail. It should be understood, however, that the drawings and detailed description are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

A DQC as described herein may be used in any situation where a digital signal is transformed into an analog signal. As such, a DQC may be used in a wide range of applications, such as, for example, industrial control (e.g., instrumentation, motors, and valves), digital audio and video (e.g., MP3, CD, DVD, and Blu-ray™ players), telecommunications (e.g., digital, satellite, and cellular telephone systems), consumer electronics (e.g., computers, televisions, displays, and video games), automotive systems (e.g., adaptive cruise control, brake systems, suspension systems, and climate control), among many others. Additionally or alternatively, a DQC may be used as a tracking power supply or regulator.

In some embodiments, a DQC may include software components, hardware components, or a combination of both. For example, a DQC may comprise an error determining circuit or module, a converting circuit or module, a correction circuit or module, and/or a scheduling circuit or module. Additional components may include, for instance, one or more programmable current sources, analog-to-digital converters ("ADCs"), capacitors, and resistors.

In some embodiments, a DQC may receive a digital signal and output an analog signal that maintains and/or manages a charge stored in a capacitor or the like. The capacitor may be either internal or external to the DQC. The voltage across the capacitor may be communicated or supplied to other circuits or devices coupled to it.

In certain embodiments, a DQC may have two distinct modes of operation: active ("wake up") and inactive ("sleep"). When operating in active mode, the DQC may measure a voltage across a capacitor. In doing so, the DQC may ascertain a present charge within the capacitor. Moreover, the DQC may receive or contain an indication of a desired or target charge, and determine the difference between it and the capacitor's present charge. In some embodiments, the indication of the target charge may be presented in the form of a voltage.

Based at least in part upon the difference between the capacitor's present charge and the target charge, one or more charge pulses may be applied to the capacitor to effect an adjustment or correction. A charge pulse may be implemented as a current source or sink, driven for a particular time duration and/or with a specific intensity. Once the charge pulse(s) are delivered, the charge within the capacitor may approach or reach that of the target charge.

In some embodiments, if the difference between the capacitor's present charge and the target charge is sufficiently small (e.g., below a threshold value), no correction needs to be made. After the charge pulse is applied, the DQC may schedule a next wake up time, and it may subsequently enter an inactive mode.

In certain embodiments, a DQC may be configured to replace a charge that has naturally leaked and/or been drained from an output capacitor by a load. Additionally or alternatively, the DQC may make a correction or update to the output capacitor's present charge based on changes in the digital input signal. The digital input signal may be a sequence of bits or words provided a regular time intervals. For example, the input signal may be a digital stream that contains sampled music or modulated communications. In those instances, the DQC may also schedule a next wake up time that allows it to process new information as it arrives at its input.

In some embodiments, the DQC may spend most of its time sleeping, and therefore not expending power. During its inactive or sleep mode, the input and/or output pins may be tri-stated, disconnected, or otherwise powered down. In some embodiments, the length of time that the DQC remains asleep may be inversely proportional to the determined charge correction. For example, if a large amount of the capacitor's charge has leaked or drained, the DQC may schedule the next wakeup time to take place in the near future. If, on the other hand, a small amount of leakage or drainage occurs, then the next wakeup may happen later.

Figure 1:
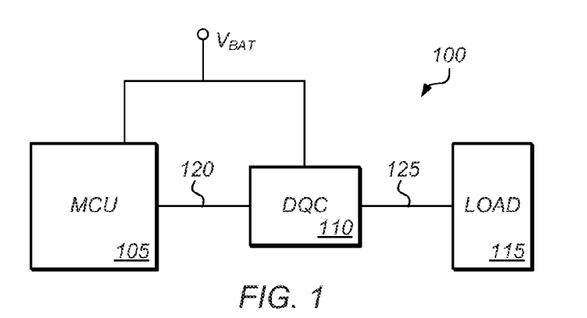
FIG. 1 is a diagram illustrating an embodiment of an electronic circuit employing a digital-to-charge converter ("DQC").

FIG. 1 is a diagram of electronic circuit 100 employing a digital-to-charge converter ("DQC") according to certain embodiments. As illustrated, microprocessor or microcontroller ("MCU") 105 is coupled to DQC 110, and DQC 110 is coupled to load 115. Both MCU 105 and DQC 110 receive power $V_{BAT}$ from a battery, an alternative power source (e.g., solar, wind, etc.), or the like. Although DQC 110 may find particular applicability in low-power applications, it may also be employed in other environments where power is unconstrained. Accordingly, in some embodiments, $V_{BAT}$ may be substituted for any other power supply or source.

In operation, MCU 105 may be configured to deliver a digital input signal (e.g., a binary signal) to input terminal 120 of DQC 110. DQC 110, on the other hand, may be configured to produce an analog output signal (e.g., an analog voltage or current) at output terminal 125 as a function of the digital input signal received at input terminal 120.

In some embodiments, the output signal at terminal 125 may be seen as an analog translation of information digitally encoded within the input signal at terminal 120. Thus, DQC 110 may enable an analog circuit, device, or load to operate in response to digital signals originated by MCU 105. In these embodiments, load 115 may include any element that is configured to be driven by an analog signal, such as, for example, a light-emitting diode ("LED"), a liquid crystal display ("LCD") cell, a lamp, a radio-frequency antenna, a loudspeaker, a sensor, a motor, a valve, a compressor, a pump, a fan, etc. As such, DQC 110 may be used in a wide range of applications such as: industrial control (e.g., instrumentation, motors, and valves), digital audio and video (e.g., MP3, CD, DVD, and Blu-ray™ players), telecommunications (e.g., digital, satellite, and cellular telephone systems), consumer electronics (e.g., computers, televisions, displays, and video games), automotive systems (e.g., adaptive cruise control, brake systems, suspension systems, and climate control), etc.

MCU 105 may be, for example, a low-power controller, microcontroller, processor, microprocessor, field-programmable gate array ("FPGA"), programmable controller, or any other suitable control circuit. Accordingly, MCU 105 may include one or more of integrated random-access memory ("RAM"), read-only memory ("ROM"), flash memory (or non-volatile memory generally), one-time programmable ("OTP") circuitry, input/output ("I/O") circuitry and controllers, reference circuitry, clock and timing circuitry (including distribution circuitry), arithmetic circuitry (e.g., adders, subtracters, multipliers, dividers), general and programmable logic circuitry, or the like.

Referring back to FIG. 1, DQC 110 is shown as a separate component of circuit 100. In other embodiments, however, DQC 110 may be integrated into MCU 105. In some cases, integrating DQC 110 into MCU 105 may improve the overall performance of circuit 100 in one or more ways such as, for example, flexibility, responsiveness, die area, cost, materials used, efficiency, accuracy, power consumption, reliability, robustness, etc. In yet other embodiments, DQC 110 may be integrated into load 115 thus making load 115 capable of directly receiving a digital signal as its input. Although one load 115 it shown in circuit 100, it should be understood that any number of loads may be operated or driven using a single DQC 110.

Figure 2A:
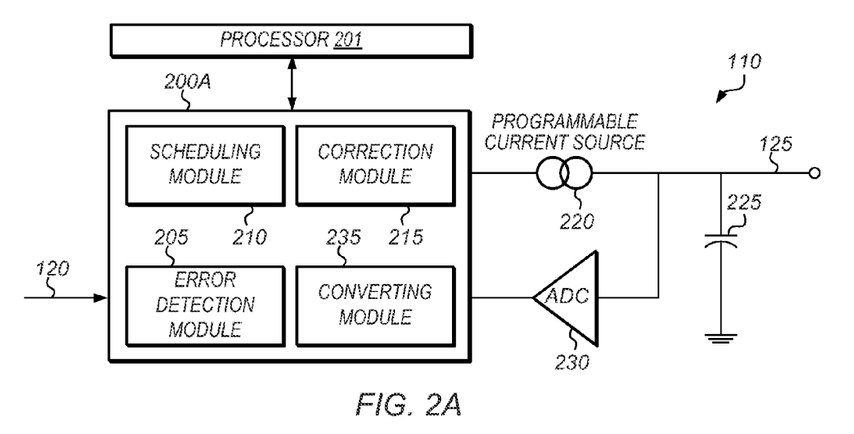
FIG. 2A is a block diagram illustrating an embodiment of a software-based DQC.
Figure 2B:
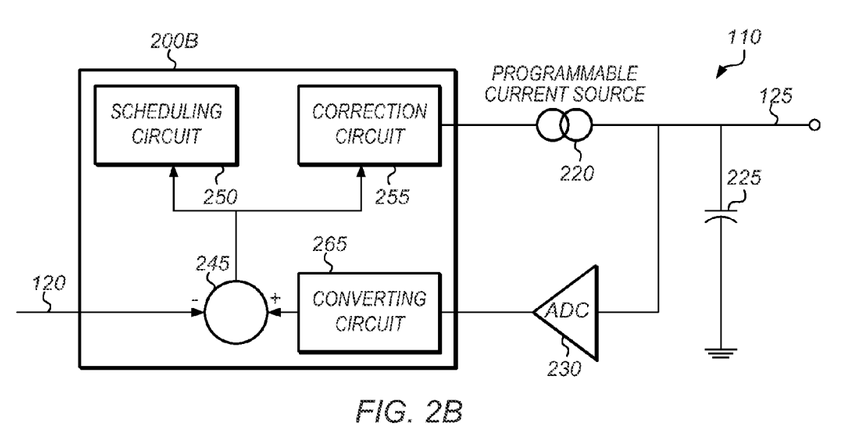
FIG. 2B is a block diagram illustrating an embodiment of a hardware-based DQC.

Referring now FIGS. 2A and 2B, block diagrams of software-based and hardware-based DQCs 110 are respectively depicted according to certain embodiments. The paragraphs that follow describe illustrative software and/or circuit elements suitable for use in each of these systems. Methods of operation applicable to both systems are described below with respect to FIG. 3.

Referring to FIG. 2A, storage medium 200A includes error detection module 205, scheduling module 210, charge correction module 215, and converting module 235. Although shown as separate modules, any of modules 205, 210, 215, and/or 235 may be combined. As a person of ordinary skill in the art will recognize in light of this specification, storage medium 200A may correspond to a memory that is accessible to (or part of) an application-specific integrated circuit ("ASIC"), FPGA, microcontroller, or any other logic circuit capable of executing instructions.

Storage medium 200A represents an illustrative embodiment of a computer-accessible or computer-readable storage medium that, during operation, stores program instructions and data. In other embodiments, program instructions and/or data may be stored upon different types of computer-accessible media. In general, a computer-accessible medium or storage medium may include any type of mass storage media or memory media such as magnetic or optical media. A computer-accessible medium or storage medium may also include any volatile or non-volatile media such as RAM (e.g. SDRAM, DDR SDRAM, RDRAM, SRAM, etc.), ROM, or the like, whether implemented as system memory, cache memory, or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 140.

The instructions stored by storage medium 200A, such as modules 205, 210, 215, and/or 235 or other suitable modules of instructions, may be executable by processor 201 to perform the various operations specified by the instructions. Processor 201 may include any processor capable of executing instructions. For example, processor 201 may be a general-purpose processor, an embedded processor, a digital signal processor (DSP), or any other suitable type of processor that implements any suitable instruction set architecture (ISA), such as, for example, one or more of the x86, ARM™, PowerPC™, SPARC™, or MIPS™ ISAs. In some embodiments, processor 201 may be integrated with storage medium 200A and/or other elements as part of an ASIC, microcontroller, or other integrated circuit structure.

The software modules shown within storage medium 200A are logically coupled to digital input 120 and programmable current source 220. (That is, the software modules may be operable to communicate with these and other hardware elements, for example via I/O ports implemented by processor 201, or via other suitable hardware.) Programmable current source 220 is coupled to capacitor 225 and to analog output 125. Analog-to-digital converter ("ADC") 230 is coupled to capacitor 225. And ADC 230 is also logically coupled to software modules shown within storage medium 200A. Although programmable current source 220, capacitor 225 and ADC 230 are shown as part of DQC 110, in some embodiments one or more of these components may be found (or otherwise considered to be) outside of DQC 110.

Referring now to FIG. 2B, hardware or circuit block 200B includes error determining circuit 245, scheduling circuit 250, correction circuit 255, and converting circuit 265. These may various components illustrate examples of what may be generally referred as an "error determiner," a "scheduler," a "controller," and a "converter," respectively. Each of circuits 220, 230, 235, 245, 250, 255, and 265 may comprise standard electronic components such as bipolar junction transistors ("BJTs"), field-effect transistors ("FETs"), other types of transistors, logic gates, operational amplifiers ("op amps"), flip-flops, capacitors, diodes, resistors, and the like. These components may be arranged to implement operations described herein in a variety of ways, and DQC 110 is not limited to any particular arrangement.

For example, in some embodiments, an error determiner such as error determining circuit 245 may implemented as a digital adder or subtractor that, during operation, may determine a difference between a measured level of charge and a target level of charge by, e.g., subtracting digital representations of these levels. A converter such as converting circuit 265 may be implemented as a binary multiplier or divider that, during operation, may convert a digital representation of a measured voltage into a corresponding measure of a level of charge, for example by evaluating an equation relating capacitance, voltage, and charge as discussed in greater detail below. Each of circuits 205 and/or 210 may be programmable. Additionally, a scheduler such as scheduling circuit 210 and/or a controller such as correction circuit 215 may be implemented as look-up tables or state machines built using programmable logic circuitry.

In some embodiments, each of circuits 245, 250, 255, and 265 may implement in hardware the functionality that is implemented by the executable instructions corresponding to modules 205, 210, 215, and 235. For example, circuits 245, 250, 255, and 265 may correspond to dedicated hardware circuits, such as state machines, datapath logic, etc., that implement the respective functionality of modules 205, 210, 215, and 235.

However, although shown as separate circuits and modules, any of these circuits or modules may be integrated or otherwise combined in other embodiments. For example, one or more of modules 210, 215, 230, and 235 may be implemented as a single software module, or one or more of circuits 245, 250, 255, and 265 may be implemented as an FPGA, controller, or the like. In some embodiments, some or all of circuits 245, 250, 255, and 265 may collectively be implemented by a general-purpose or special-purpose processor that, during operation, executes instructions that cause the processor to perform the operations of these circuits. In some embodiments, circuits 245, 250, 255, and/or 265 need not map to discrete, independent circuits, but rather may correspond to the same implementing processor. For example, in some embodiments, circuits 245, 250, 255, and/or 265 may correspond to one or more arithmetic logic units or other circuits of a processor that, upon executing different instructions, perform the functions of various ones of these circuits.

It is also contemplated that in some embodiments, a mixture of software modules and hardware circuits may also be employed to implement DQC 110.

Referring to FIGS. 2A and 2B, programmable current source 220 may be, for example, a programmable constant current source that provides an output current that stays constant with changes in load impedance—i.e., its output voltage may vary as necessary to maintain a desired current level through the load. Programmable current source 220 may also be operable to provide a variable output current that may be adjusted to maintain a desired voltage level across the load. For example, programmable current source 220 may receive a digital value from a software module (such as correction module 215) that indicates or corresponds to a particular charge pulse to be output by programmable current source 220. The charge pulse may act as a source or sink having a specific time duration and/or intensity.

Capacitor 225 is illustrated as a single capacitor, but certain implementations may use two or more capacitors. Moreover, additional elements such as pull-up or pull-down resistors, inductors, etc. (not shown) may also be used in conjunction with capacitor 225.

Figure 2C:
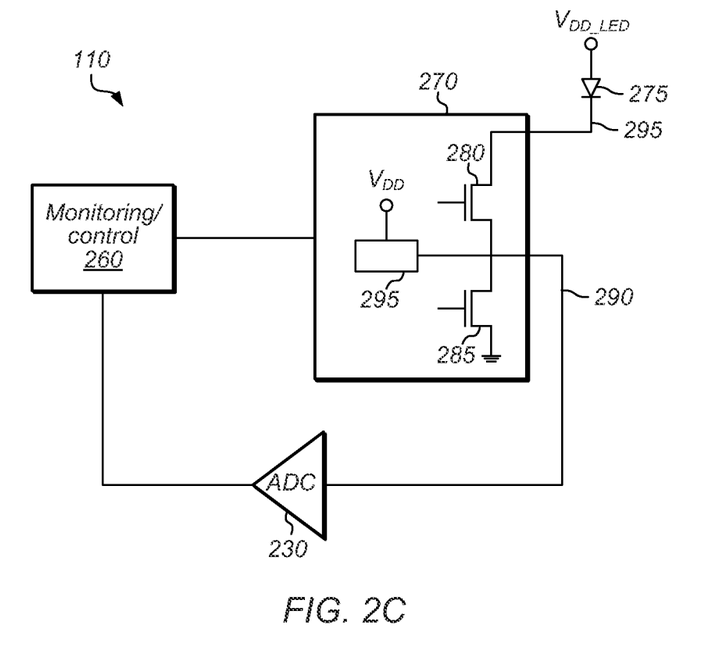
FIG. 2C is a block diagram illustrating an embodiment of an LED driver coupled to a monitoring and control circuit.

In some embodiments, either of DQCs 200A or 200B as illustrated in FIGS. 2A and 2B may be employed within an optical sensor or the like. For example, in certain embodiments, DQCs 200A or 200B may be used in connection with light-emitting diode (LED) drivers. FIG. 2C is a block diagram showing an embodiment of an LED driver. As illustrated, monitoring/control circuit 260 is coupled to LED driver 270, LED driver 270 is coupled to ADC 230, and ADC 230 is coupled in turn to monitoring/control circuit 260.

LED driver 270 may be, for example, as described in U.S. patent application Ser. No. 12/650,738, entitled "HIGH-VOLTAGE CONSTANT-CURRENT LED DRIVER FOR OPTICAL PROCESSOR" filed on Dec. 31, 2009. Specifically, in some embodiments, LED driver 270 may have a two-transistor stack including transistor 280 and transistor 285. In operation, transistor 285 may set an accurate current level for LED operation, while transistor 280 may provide voltage protection for transistor 285 and output impedance for LED driver 270. Output monitoring and control node 290 may be coupled to ADC 230, whereas LED 275 may be coupled to transistor 280 via driver output 295. Monitoring/control circuit 260 may be operable to control the operation of LED driver 270, for example based on the feedback received from node 290. LED driver 270 also includes a programmable current source 295 that may source or sink a current into node 290. In some embodiments, LED drive level may be on the order of tens of milliamperes (as opposed to being on the order of microamperes, as might be the case in a typical analog-to-digital converter).

In some cases, multiple instances of LED driver 270 may be implemented within a given device. However, it may be the case that in a given application, some of these LED drivers 270 are not employed to drive LEDs. For example, the number of implemented drivers may exceed the number of LEDs being used. Correspondingly, in some embodiments, an instance of LED driver 270 that is not being used to drive an LED may be operable to perform a different function, such as implementing the DQC functionality discussed here.

For example, in some embodiments, LED driver 270 may have at least three modes of operation: active (or "LED on" mode), inactive (or "LED off" mode), and DQC. In a non-limiting example, when LED driver 270 is in active mode, the LED driver circuitry may be active to drive an LED through output 295 as shown in FIG. 2C, and both transistors 280 and 285 may be turned on. When LED driver 300 is in inactive mode, both transistors 280 and 285 may be turned off.

Figure 2D:
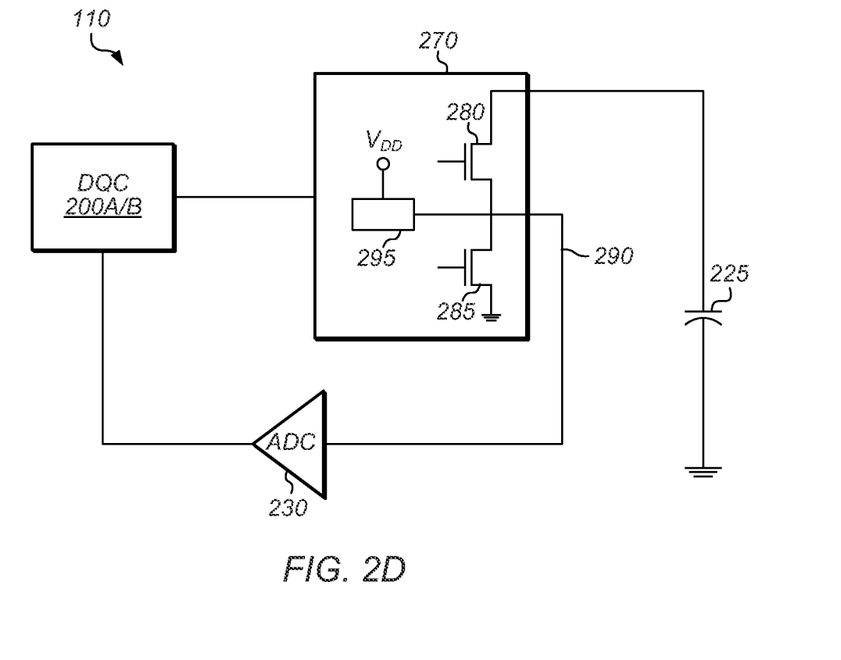
FIG. 2D is a block diagram illustrating a hardware- or software-based DQC coupled to an embodiment of an LED driver that is configured for a DQC mode of operation.

FIG. 2D illustrates an embodiment of LED driver 270 that is configured for a DQC mode of operation. As shown, LED driver 270 is coupled to an instance of DQC 200A/B, which may be configured to control the operation of LED driver 270 in DQC mode. Additionally, capacitor 225 may be coupled to LED driver 270 in place of the LED shown in FIG. 2C. When LED driver 300 is in DQC mode, transistor 280 may be turned on to provide a charge pulse to capacitor 225, whereas transistor 285 may be turned off. For example, during DQC-mode operation, DQC 200A/B may control current source 295 to drive current through transistor 280 in order to provide a charge pulse to capacitor 225. In some embodiments, LED driver 270 may also operate to remove charge from capacitor 225, for example via current source 295, device 285, or a different path.

Thus, the same LED driver 270 may serve a number of different functions, allowing unused drivers to be adapted for other purposes such as DQC operation. It is noted that in some embodiments, an instance of LED driver 270 might be coupled either to an LED 275 or to a DQC capacitor 225, but not necessarily both at the same time. It is also contemplated that in some configurations, LED driver 270 may be coupled to devices other than LED 275 or DQC capacitor 225.

Figure 3:
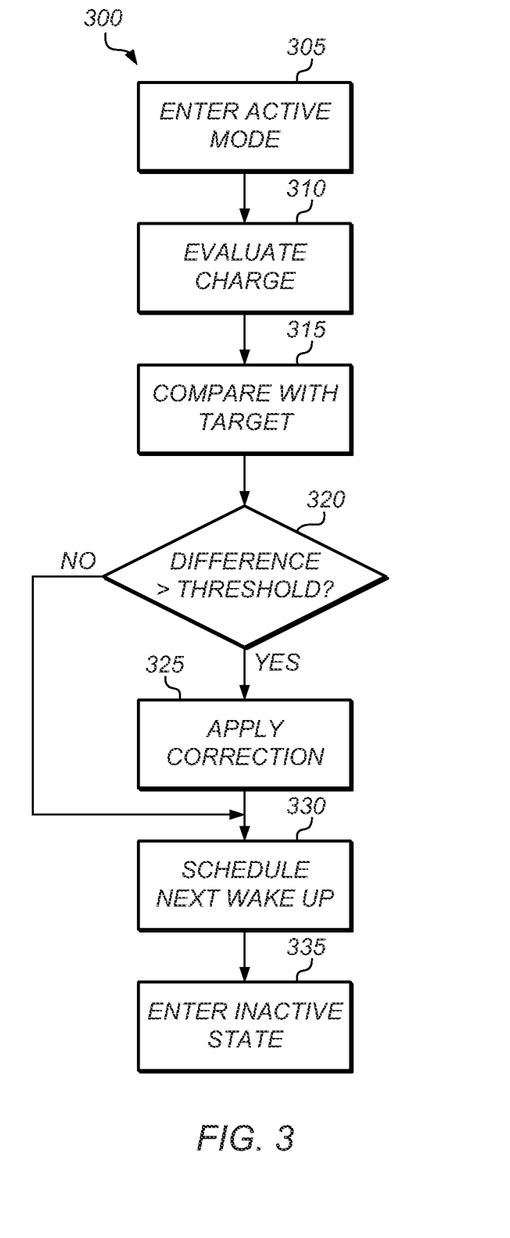
FIG. 3 is a flowchart illustrating an embodiment of a method of operation of a DQC.

Referring to FIG. 3, illustrative operations of DQC 110 of FIGS. 2A-C are described according to some embodiments. As shown, DQC 110 may operate in one of two modes: active ("wake up") or inactive ("sleep"). At 305, DQC 110 may enter an active mode ("wake up"). This may take place, for example, when DQC 110 is first powered on (i.e., at reset) or when a start-up code or signal is delivered to input terminal 120.

At 310, DQC 110 may evaluate a charge presently stored within capacitor 225. For example, ADC 230 may measure a voltage across capacitor 225 and may provide a first digital signal indicative of that voltage to a software module shown in storage medium 200A (e.g., converting module 235) or to circuit 200B. Converting circuit 265 or module 235 may receive the first digital signal and multiply the measured voltage by a known or stored capacitance of capacitor 225 to calculate a charge value (referred to as a "present charge") corresponding to the electrical charge within capacitor 225. This conversion operation may be performed, for example, by evaluating the following equation:

$$C = \frac{Q}{V} \qquad \text{Equation (1)}$$

where C is a capacitance, Q is a charge, and V is a voltage. An indication of the present charge may then be provided to error determining circuit 245 or module 205.

Meanwhile, the software modules of storage medium 200A or the hardware circuit 200B may also receive a second digital input signal via terminal 120. The second digital input signal may contain an indication of a charge desired to be accumulated within capacitor 225 (referred to as a "target charge"). In other embodiments, however, the target charge may be a value or signal stored or pre-programmed within DQC 110. For example, embodiments of DQC 110 may be operable to maintain a constant target charge across a time-varying load.

At 315, error determining circuit 245 or module 205 may compare the measured or determined charge with a target or desired charge. For example, error determining circuit 245 or module 205 may calculate a difference between the present charge and the target charge. Error determining circuit 245 or module 205 may then provide the difference between the measured charge and the target charge to correction circuit 255 or module 215. At 320, correction circuit 255 or module 215 may determine whether the difference satisfies a pre-determined condition. For example, correction circuit 255 or module 215 may determine whether the difference is larger than a threshold amount.

At 325, if the charge difference is larger than the threshold—or if the condition is otherwise satisfied—correction circuit 255 or module 215 may apply a control signal to programmable current source 220. In response to the control signal, programmable current source 220 may deliver a charge pulse to capacitor 225. In some embodiments, the control signal and/or charge pulse may be derived based on a stored look-up table indexed by a difference between the target charge and the present charge. Alternatively, the control signal and/or charge pulse may be derived based on a mathematical formula. Moreover, in some embodiments, the time duration and/or intensity of the charge pulse may be directly proportional to the difference between the target and present charges. In any event, the charge pulse may be calculated such that, when it is delivered, the charge within capacitor 225 may approach or reach that of the target charge.

As noted above, the charge pulse output by programmable current source 220 may act as a current source or sink. If the charge of capacitor 225 is below the target charge, the charge pulse may be a current source to replenish and/or add charge to capacitor 225. In some instances, however, capacitor 225 may be overly charged such that its present charge is greater than the target charge. In that case, the charge pulse may act as a current sink to decrease the charge of capacitor 225. Accordingly, in some embodiments, a pull-down resistor (not shown) or the like may be coupled to capacitor 225 to facilitate its discharge. Additionally or alternatively, DQC 110 may be configured or programmed to allow the natural leakage and/or normal operation of the load coupled to capacitor 225 to return the charge of capacitor 225 to the level of the target charge over time.

At 330, scheduling circuit 250 or module 210 may then schedule the next wakeup time of DQC 110 and cause DQC 110 to enter an inactive mode. For example, circuit 250 or module 210 may program an external timer or interrupt (not shown) that causes DQC 110 to enter the active mode at a selected future time. In some embodiments, the next wakeup time may also be based at least in part on the difference between target charge and the present charge. For example, the wakeup time interval may be selected to be inversely proportional to the charge error, such that wakeup occurs more frequently if the measured error is larger. The wakeup time determination may also be based on a look-up table or formula. Then, at 335, DQC 110 may enter an inactive mode, where it may remain until the next wakeup time.

Referring back to 320, if the charge leakage is small such that the difference between the measured charge and the target charge is determined to be smaller than the threshold—or the condition is otherwise not satisfied—scheduling circuit 250 or module 210 may schedule the next wakeup time without correction circuit 255 or module 215 calculating and/or applying any correction to capacitor 225.

Additionally or alternatively, DQC 110 may automatically wake up periodically and/or at pre-determined times other than the times described above. For example, when the input signal at terminal or pin 120 has a particular rate (e.g., a bus speed or sampling interval), scheduling circuit 250 or module 210 may determine when a new value (e.g., a byte or word) is expected to arrive at DQC 110. If the new value is expected (or assumed) to indicate that the charge within capacitor 225 will change, then scheduling circuit 250 or module 210 may ensure that DQC 110 wakes up in time to process the updated value.

As previously discussed, the digital input signal received at terminal 120 may encode a "target charge" level. The target charge level may be constant or may change over time. In some embodiments, the charge level may be provided in units of electric charge—e.g., coulombs. In these cases, converting module 235 or circuit 265 may hold or store a capacitance value of capacitor 225—e.g., in farads. Accordingly, converting module 235 or circuit 265 may take the measured voltage provided by ADC 230 and multiply it by the known capacitance of capacitor 225 to arrive at a "present charge" that may be compared with the target charge by error detection module 205. Charge correction module 215 or circuit 255 may then receive a difference between the target charge and the present charge—e.g., also in coulombs—and it may derive an electrical current level that programmable current source 220 may apply to capacitor 225 for it to attain or approach the target charge level.

In other embodiments, the indication encoded within the digital input signal at terminal 120 may be represented as a target voltage—e.g., in volts. In some embodiments, DQC 110 may convert the target voltage to an equivalent target charge at input terminal 120, while in other embodiments, internal calculations within DQC 110 may be performed in terms of voltages and later converted to determine the charge pulse needed from programmable current source 220 to achieve the target voltage across capacitor 225.

In yet other embodiments, the "charge level" may be in a non-standardized unit of measurement, in which case converting module or circuit 235 may hold additional or alternative converting information that allows error detection module 205 or circuit 245 to make a meaningful comparison between a digital input signal at terminal 120 and a desired analog output signal at terminal 125.

Generally speaking, DQC 110 may spend most of its time sleeping, therefore not expending power, which may help facilitate the design of systems for low-power applications. During its inactive or sleep mode, input pin 120 and/or output pin 125 may be tri-stated, disconnected, or otherwise powered down. In some embodiments, the length of time that DQC 110 remains asleep may be inversely proportional to a determined charge leakage. For example, if a large amount of the capacitor's charge has leaked, DQC 110 may schedule the next wakeup time to take place in the near future. If, on the other hand, the amount of leakage that occurs is relatively small, then the next wakeup may happen correspondingly later than in the large-leaking case. Again, the sleep time may be calculated based on a stored look-up table or mathematical formula.

Figure 4:
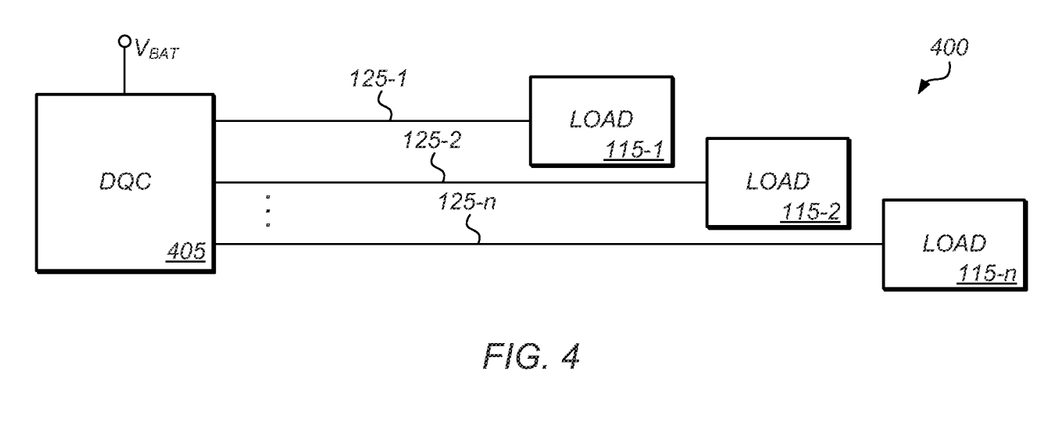
FIG. 4 is a block diagram of an embodiment of a DQC acting as a tracking or regulated power supply.

Referring now to FIG. 4, a block diagram of a DQC 405 acting as a tracking or regulated power supply is depicted according to certain embodiments. In the illustrated embodiment, DQC 405 may be an instance of DQC 110 described above, or a suitable variant thereof. For sake of illustration, DQC 405 is shown driving three loads 115-1 through 115-$n$ via output lines 125-1 through 125-$n$, respectively. In some embodiments, however, DQC 405 may be configured to drive a single load and/or have a single output line. Loads 115-1 through 115-$n$ may be any digital circuit such as, for example, a microcontroller or processor, a FPGA, RAM, ROM), flash memory, OTP circuitry, I/O circuitry, etc., as well as any analog circuit.

In the embodiment shown in FIG. 4, DQC 405 may be hardware or software-based as described in FIGS. 2A and 2B. And when employed to drive two or more loads 115-1 through 115-$n$, DQC may include two or more sets of modules and/or circuits, respectively. Programmable current source 220, capacitor 225 and ADC 230 may also be duplicated for each of loads 115-1 through 115-$n$. Additionally or alternatively, two or more loads may share a single output pin 125.

When used as a tracking or regulated power supply, DQC 400 may not need to receive a digital input, and may instead be internally programmed to maintain a certain charge within or voltage across capacitor 225. Accordingly, correction circuit 255 or module may 215 replenish the charge of capacitor 225 that has leaked or drawn by a connected load at least to some extent. Moreover, in some embodiments scheduling circuit or module 210 need not make wake-up contingencies for expected input signal changes.

As a person of ordinary skill in the art will recognize in light of this specification, DQC 110 as described herein provides numerous differences compared with pulse-width modulation ("PWM") circuits. For example, PWM causes a microcontroller to wake up at twice the PWM frequency, while its capacitor charges and discharges in tune with the PWM frequency. The resistor of the PWM circuit is typically dissipating energy all the time. On the other hand, DQC 110 may wake up to measure the voltage of the capacitor to ascertain how much it has leaked. In some cases, DQC 110 may replace the charge that has naturally leaked. If there is little leakage, no correction is made and the next wakeup can be increased.

Another difference between PWM circuits and DQC 110 is that the I/O can be powered down, while PWM requires its I/O to be powered up continuously, thus adding to overall power consumption. In other words, in some embodiments DQC 110 may not need to wake up as often as the PWM, it may not impose a charge/discharge cycle that the PWM does, and it may allow the power to the I/O pins to be powered down, each of which may promote a lower overall system power use.

Although the embodiments above have been described in considerable detail, numerous variations and modifications will become apparent to those skilled in the art once the specification is fully appreciated. It is intended that the following claims be interpreted to embrace all such variations and modifications.

What is claimed is:

1. An apparatus, comprising:
    a converter configured to receive a first digital signal indicative of a voltage across a capacitor coupled to an output pin of the converter, and to determine a present charge of the capacitor based at least in part on the first digital signal;
    an error determiner coupled to the converter, wherein the error determiner is configured to receive a second digital signal indicative of a target charge via an input pin of the converter, and to determine a difference between the target charge and the present charge; and
    a controller coupled to the error determiner, wherein the controller is configured to control a programmable current source to produce an analog signal at the output pin in response to the determined difference.

2. The apparatus of claim 1, wherein the converter, the error determiner, and the controller are implemented by a processor that is configured to execute instructions that cause the processor to:
    receive the first digital signal indicative of the voltage across the capacitor coupled to the output pin of the apparatus and determine the present charge of the capacitor based at least in part on the first digital signal;
    receive the second digital signal indicative of the target charge via the input pin of the apparatus and determine the difference between the target charge and the present charge; and
    control the programmable current source to produce the analog signal at the output pin in response to the determined difference.

3. The apparatus of claim 1, wherein the programmable current source comprises a light emitting diode (LED) driver, wherein during a first mode of operation, the LED driver is operable to drive an LED coupled to the LED driver, and wherein during a second mode of operation, the LED driver is coupled to supply a charge to the capacitor.

4. The apparatus of claim 1, further comprising a plurality of light emitting diode (LED) drivers, wherein the programmable current source comprises a first one of the LED drivers that is configured to supply a charge to the capacitor, and wherein a second one of the LED drivers is configured to drive an LED coupled to the second LED driver.

5. The apparatus of claim 1, wherein the second digital signal encodes a target voltage value, and wherein the apparatus is configured to convert the target voltage value into the target charge.

6. The apparatus of claim 5, wherein the analog signal is a charge pulse.

7. The apparatus of claim 6, wherein the charge pulse is generated such that the charge pulse increases or decreases the present charge dependent upon the target charge.

8. The apparatus of claim 6, further comprising an analog-to-digital converter coupled to the converter coupled to the error determiner, wherein the analog-to-digital converter is configured to measure the voltage across the capacitor.

9. The apparatus of claim 5, further comprising a scheduler coupled to the error determining circuit, wherein the scheduler is configured to cause the apparatus to enter an inactive mode.

10. The apparatus of claim 9, wherein the output pin is disabled during the inactive mode.

11. The apparatus of claim 9, wherein the scheduler is configured to determine a length of time that is inversely proportional to the magnitude of the difference between the target charge and the present charge, and wherein the scheduler is further configured to cause the apparatus to enter a subsequent active mode after the length of time elapses.

12. A method, comprising:
    receiving, at a converter, a first digital signal indicative of a voltage across a capacitor coupled to an output pin of the converter;
    the converter determining a present charge of the capacitor based at least in part on the first digital signal;
    receiving, at an error determiner, a second digital signal indicative of a target charge via an input pin of the converter;
    the error determiner determining a difference between the target charge and the present charge; and
    in response to the determined difference, controlling a programmable current source to produce an analog signal at the output pin.

13. The method of claim 12, wherein the second digital signal encodes a target voltage value, and wherein the method further comprises:
    converting the target voltage value into the target charge.

14. The method of claim 12, wherein the analog signal is a charge pulse generated such that the charge pulse increases or decreases the present charge dependent upon the target charge.

15. The method of claim 12, further comprising:
    measuring, at an analog-to-digital converter, the voltage across the capacitor.

16. The method of claim 12, wherein the programmable current source comprises a light emitting diode (LED) driver, and wherein the method further comprises:
    during a first mode of operation, operating the LED driver to drive an LED coupled to the LED driver; and
    during a second mode of operation, operating the LED driver to supply a charge to the capacitor.

17. The method of claim 12, further comprising:
    entering an inactive mode in which the output pin is disabled.

18. The method of claim 17, further comprising:
    determining a length of time that is inversely proportional to the magnitude of the difference between the target charge and the present charge; and
    after the length of time elapses, entering a subsequent active mode.

* * * * *